Sept. 17, 1940.   W. B. BARNES   2,214,986
PLANETARY OVERDRIVE AND FREE WHEELING TRANSMISSION
Filed Nov. 30, 1932   3 Sheets-Sheet 1

INVENTOR.
William B. Barnes,
BY
Hood & Hahn
ATTORNEYS

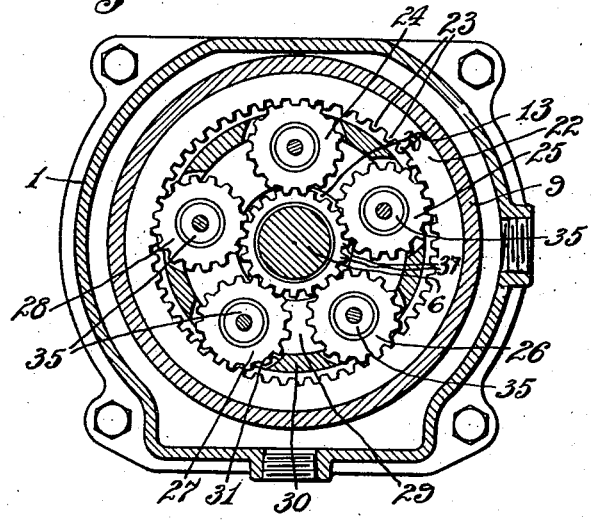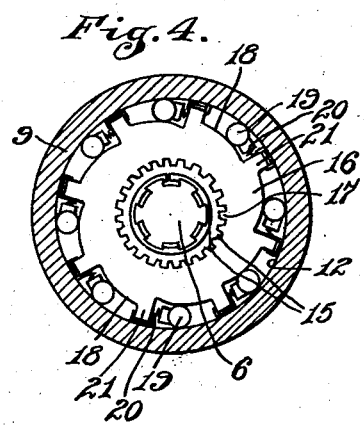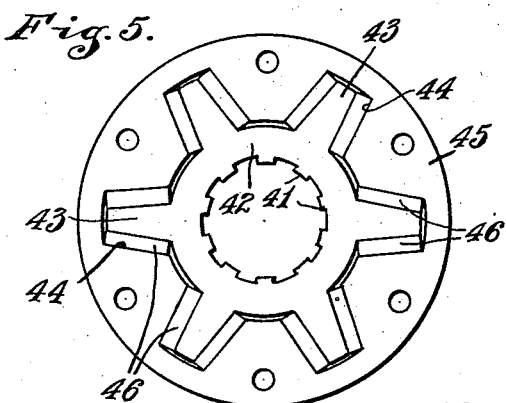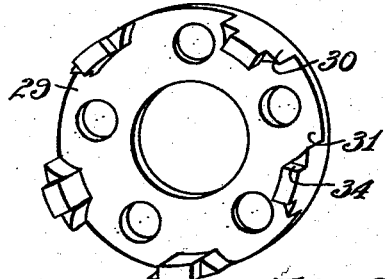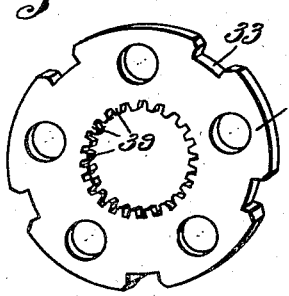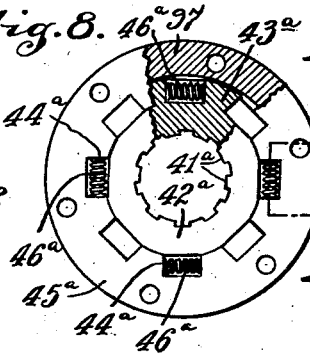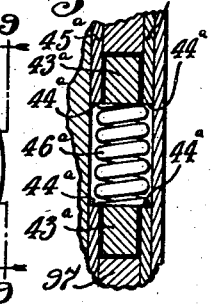
INVENTOR.
William B. Barnes,
BY Hood & Hahn
ATTORNEYS

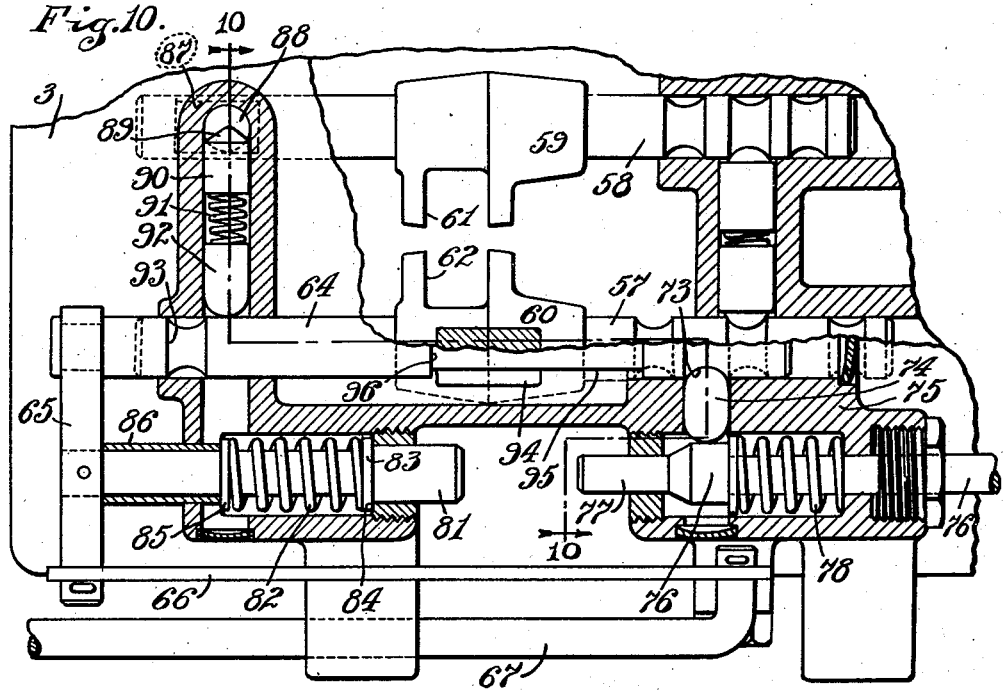

Patented Sept. 17, 1940

2,214,986

UNITED STATES PATENT OFFICE 2,214,986

PLANETARY OVERDRIVE AND FREE WHEELING TRANSMISSION

William B. Barnes, Indianapolis, Ind., assignor to Barnes Motor Developments Company, Muncie, Ind., a partnership composed of said William B. Barnes and Freda Arthur Barnes Application November 30, 1932, Serial No. 645,030

63 Claims. (Cl. 74—290)

My invention relates to an improvement in transmission gearings particularly adapted for automobiles and more particularly relates to a transmission mechanism by which an "overspeed" drive may be provided for the rear axle under certain predetermined conditions.

It has been found in practice that where an automobile is being driven over comparatively level roads where an excess of power is not necessary, by driving the rear axle at a higher gear ratio than is ordinarily provided, the engine will necessarily operate at a relatively lower speed, thus cutting down the wear and tear on the engine parts and decreasing engine noise.

My present invention is particularly adapted for such use and is so arranged that the overspeed drive may be readily thrown into operation whenever desired by the operator.

For the purpose of disclosing my invention I have illustrated certain embodiments thereof in the accompanying drawings in which:

Fig. 3 is a transverse sectional view on the line 3—3 of Fig. 2;

Fig. 4 is a transverse sectional view showing a form of overrunning clutch which may be used in connection with my invention;

Fig. 5 is an end elevation of the sun gear locking plate;

Fig. 6 is a perspective view of one of the members of the planetary casing;

Fig. 7 is a perspective view of the other member;

Fig. 8 is an end elevation partly in section of a modified form of sun gear locking means;

Fig. 9 is a detail section on the line 9, 9 of Fig. 8;

Fig. 10 is a plan view, partially in section, of a transmission shift mechanism showing means for controlling the over-drive transmission;

Fig. 11 is a detail side elevation thereof; and

Fig. 12 is a detail transverse section thereof.

Figure 1:
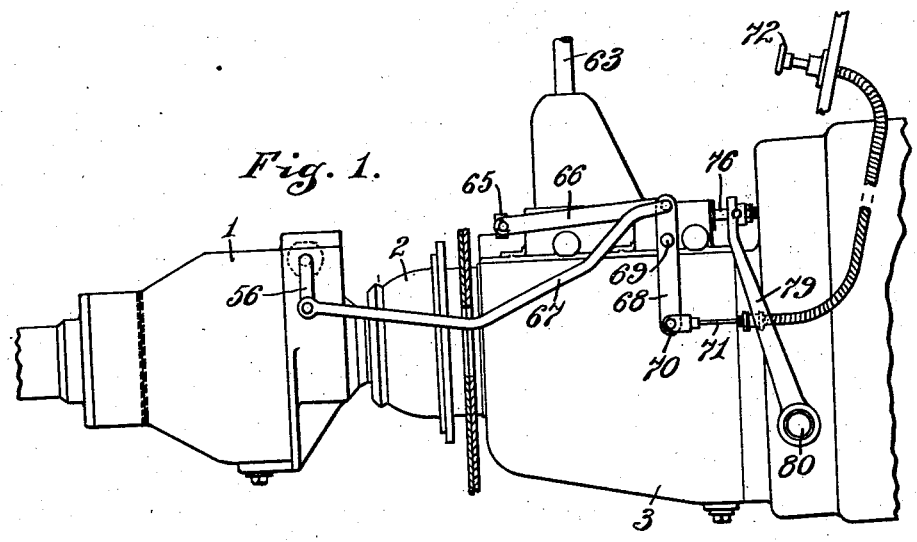
Fig. 1 is a side elevation of a transmission and my over-speed transmission associated therewith.

In the structure illustrated the over-speed transmission is mounted in a casing 1 having a forward extension 2 adapted to be bolted or otherwise secured to the rear end of an ordinary three-speed and reverse transmission 3, such as is now used in the conventional form of automobile drive.

In the structure illustrated in the driven shaft 4 of the transmission 3 extends rearwardly and into the extension 2 of the casing 1. This driven shaft 4 becomes in effect the drive shaft of the over-speed transmission and its rear end is supported in suitable roller bearings 5 in the casing. An axially shiftable shaft 6 is piloted in and splined to the shaft 4 for a purpose which will more fully appear hereinafter.

The propeller shaft 7 of the vehicle is supported in the rear end of the casing 1 by means of suitable ball bearings 8 and this propeller shaft has secured thereon an overhanging ring member 9 provided with a hub 10 suitably splined on the shaft 7. This overhanging member 9 is provided with a plurality of stepped portions 11, 12, and 13. The smaller stepped portion 11 is provided with internal clutch teeth 14 adapted to receive under certain predetermined conditions radial clutch teeth 15 formed on the rear end of the axially movable shaft member 6. The next or second stepped portion 12 forms the outer surface, or outer member, of an overrunning clutch. The inner member 16 of this clutch is provided with internal teeth 17 adapted to receive the teeth 15, to thereby rotatively lock the inner member 16 to the shaft 6. This inner member, at its outer periphery, is provided with a plurality of cammed surfaces 18, in the present instance, eight in number, each of which receives a roller 19 which is biased toward its locking position by a suitable coiled spring 20 interposed between the roller and a radial projection 21. This construction provides an overrunning or free wheeling clutch so arranged that when the overrunning clutch is operative, in event the propeller shaft 7 operates at a greater speed than the shafts 6 and 4, the propeller shaft will be disconnected from these two shafts to provide what is commercially known as free wheeling. The portion 13 of the overhanging member 9 receives a ring gear 22 of a planetary transmission. This ring gear is preferably formed of hardened steel having the internal teeth 23 cut therein and after the gear has been formed the rim 22 is driven by a pressed fit into the portion 13 which provides a firm engagement between the overhanging member 9 and the ring gear, which engagement is sufficiently firm to provide for driving the overhanging member through the ring gear.

The pinions 24, 25, 26, 27, and 28 of the planetary transmission are suitably supported in a pinion cage which consists of a housing 29 preferably stamped from sheet metal having the overhanging flange 30 which is cut away as at 31 to permit the pinions 24—28 to extend therethrough. The cover plate 32 for this housing has a series of notches 33 formed in its periphery to receive tongues 34 formed on the flange 30 and after the parts have been assembled with the pinions within the housing, the housing and its plate may be permanently connected together by spot welding the tongues 34 in their notches 33, or in any other suitable manner. The stub shafts 35 on which the pinions 24—28 are mounted extend through openings formed in the cover plate 32 and in the wall of the cage 31, being maintained in position by spacing rings 36 attached to reduced portions on their ends. It will thus be seen that the cage and associated pinions form more or less a unitary structure which when assembled in position provides for a meshing of the teeth of the pinions 24—28 with the teeth 23 of the ring gear and with teeth 37 formed on a sun gear member 38 surrounding the shaft 6 and locked to the casing in a manner to be hereinafter described.

This cover plate 32, is provided with internal teeth 39 adapted to be engaged by, under certain predetermined conditions, the teeth 15 on the axially shiftable shaft 6. The results to be accomplished by this engagement will appear more fully hereinafter.

Figure 2:
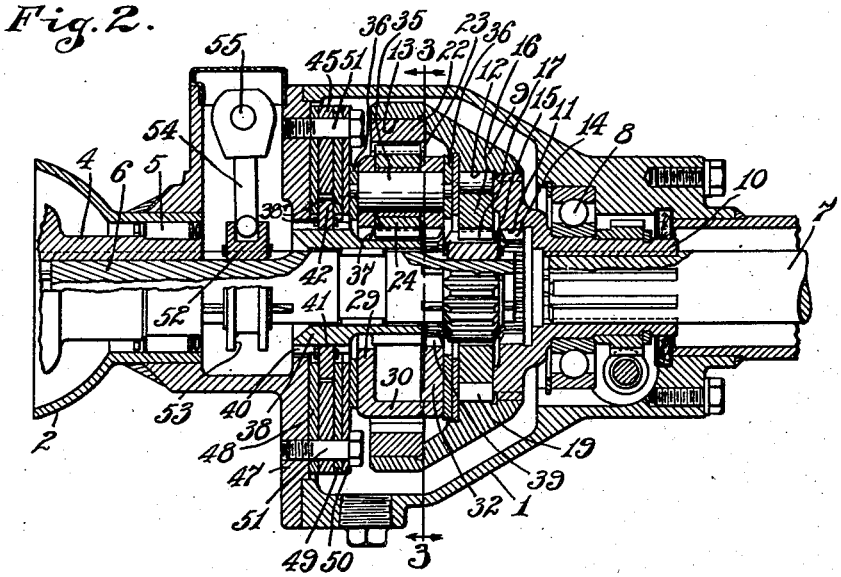
Fig. 2 is a longitudinal sectional view of the over-speed transmission.

As explained the sun gear member 38 surrounds the shaft 6 and this sun gear hub 38 is provided with teeth or splines 40 engaging teeth or splines 41 in a locking ring 42. This ring is provided with a series of radially extending arms 43 which fit within recesses or notches 44 in a holding plate 45 and between the arms and the side walls of the notches I interpose cork or other resilient deadening material pads 46 whereby a torsional resiliency is permitted between the parts. The plate 45 is bolted to the wall 47 of the casing 1 thereby locking this plate to the wall and preventing rotation thereof, and in order to deaden the noise of the transmission I interpose between the plate 45 and the wall 47 a cork disc 48. Furthermore a cork disc 49 is interposed between the plate 45 and a holding plate 50 through which the bolts 51 extend. It is thus seen that noises set up as the result of the running of the pinions 24—28 will not be transmitted to and through the casing whereby I am enabled to get an extremely quiet running planetary transmission. The sun gear member or hub 38 has a clearance throughout at least the greater portion of the length between it and the shiftable shaft 6. This not only permits of an easier shifting of the shaft, friction being reduced to a minimum, but permits a slight movement of the free end of the sun gear member to accommodate itself to any slight variation in the pinion gears. This is especially so as the anchor for permitting rotation of the sun gear is at one end of the sun gear member 38 and this anchoring means is such as to permit a certain freedom of movement transverse to the axis of the sun gear member. In Fig. 2 it will be seen that the anchoring member 42 is secured between the cork or resilient discs 48 so that even assuming that the splined connection between the sun gear member and this anchoring member were so tight there would still be a movement due to these resilient discs. This arrangement provides what might be termed a universal joint between the sun gear and the casing whereby the sun gear is locked against rotative movement while the free end is permitted a slight movement in all directions transverse to its axis.

Furthermore it is to be noted that the teeth 15 are of such height that they will not "bottom" in the teeth 39 when engagement is made with these teeth, and that the teeth of the pinions 28, as shown in Fig. 2, do not "bottom" in the teeth of the ring gear. Therefore, when the teeth 15 are engaged with the teeth 39 and the planetary gearing is thus operated, the pinion carrier and its associated pinions might be said to be radially floatingly mounted. That is, there is a certain amount of freedom of movement transversely to the axis of the pinions permitted. This allows the pinions during their rotation to adjust themselves to certain slight inaccuracies, resulting in the construction thereof, thereby reducing to a minimum any vibration or noise or hum set up in the structure. To be sure, this floating action is very slight, but on the other hand, it only requires a very slight movement for the pinions to adjust themselves.

The split rings 38' take into notches in the teeth 40 on either side of the disk 42 and thereby lock the sun gear sleeve against axial displacement in either direction while permitting a limited rotative movement of the sun gear; that is, such a rotative movement as would be permitted due to the resiliency of the sound absorbing material 46 or of the springs 46a. Furthermore in order to prevent unnecessary noise in the transmission the angular spacing between the pinions 24, 25, 26, 27, and 28 is on a seventy degree angle while the spacing between the pinions 28 and 24 is on an eighty degree angle. This sets up an unusual engagement of the teeth of the pinions between the sun gear teeth 37 and the ring gear teeth 49 in such a manner that there is a deadening effect of the noises occasioned by the running of these teeth together.

This differential spacing between the pinions results in a differential in the moment of engagement between the teeth of the respective planet pinions and the teeth of the sun and ring gears, whereby at no given instant do the teeth of any two planetary gears have the same contacting relationships with the respective sun and ring gears. As a result instead of a cumulative impact of the teeth resulting in considerable noise the impact of teeth is spread so that at any given instant the sound arising is from one gear only instead of the sum total of all of the gears. As a result of the above-mentioned angular spacing I am enabled to form the ring gear with teeth the number of which is never a multiple of the number of pinions engaging therewith and for this reason the above deadening effect is created. This same effect could be accomplished of course by making the number of the sun gear teeth other than a multiple of the number of pinions instead of the teeth on the ring gear or for that matter, both the ring gear and the sun gear could have teeth the number of which is other than a multiple of the number of pinions.

The operation of the device so far described is as follows: When the shaft 6 is shifted to the right, Fig. 2, until the teeth 15 mesh with the teeth 14, the shafts 4 and 7 will be directly connected through the shaft 6 and there will be accordingly a direct drive from the shaft 4 to the shaft 7 in two directions. If the shaft 6 is shifted sufficiently to the left, looking at Fig. 2, until the teeth 15 are out of engagement with the teeth 14 the drive will be through the overrunning clutch heretofore described and will therefore be a uni-directional drive, the overrunning clutch permitting the overrunning of the shaft 7 in event this shaft operates at a higher speed than the shafts 4 and 6. If the shaft 6 is shifted further to the left until the teeth 15 mesh with the teeth 39 of the pinion gear cage then an overdrive connection will be established through the planetary drive including the sun gear 37, the pinions 24—28 and the ring gear 49, which it will be remembered is connected to the overhanging member 9 of the shaft 7. The gear ratio of this planetary gearing is such that there will be a step up in the speed of the shaft 7 when driven through the planetary gearing. It is thus seen that I have provided what may be termed an overdrive for the propeller shaft of an automobile, which overdrive mechanism also includes means whereby free wheeling may be obtained at normal drive or whereby this free wheeling drive may be locked out.

For the purpose of shifting the shaft 6 to its various positions this shaft is provided with an axially stationary collar 52 having an annular groove 53 adapted to receive a shift fork 54. This fork is mounted on a shaft 55 extending through the casing 1 and having secured thereto, outside of the casing, a lever arm 56.

The usual shift rods 57 and 58, for controlling the transmission 3, are provided in the transmission casing, these rods being provided with the usual shift forks having hubs 59 and 60 secured on the shift rods and provided respectively with slots or recesses 61 and 62 to receive the lower end of the shift lever 63, as is usual in the standard practice of automobile transmission construction. The shift rod 57 is for shifting into reverse and low, being moved to the left, looking at Fig. 10, for reverse and to the right for low speed. The shift rod 58 is used for shifting the transmission into second and high speeds and is shifted to the left for second speed and to the right for high speed. This is the standard movement of transmission shift rods and my shift mechanism for controlling the overspeed drive is so associated with this structure that when the transmission is shifted into reverse the overrunning clutch of the overspeed drive is locked out. Furthermore the association is such that the overspeed drive will not be operable when the standard transmission is shifted into second or low speed. This is done to avoid placing unusual strain on the overspeed drive structure. Furthermore the arrangement is such that in order to shift into overspeed drive the engine clutch has to be disconnected.

The shift rod for the overspeed drive is shown as a rod 64 which, it will be noted in Fig. 11, is arranged above the shift rods 57 and 58. This shift rod has a lateral extension 65 secured thereto to which is connected a link 66 in turn connected to a connecting rod 67 extending to the lever arm 56. The link 66 is also connected to one end of a lever arm 68 pivoted at 69 and having its opposite end 70 connected to a Bowden wire 71 extending to an operating handle 72 conveniently placed within the reach of the operator and preferably on the instrument board, so that when you pull on the handle 72 the shaft 6 will be shifted to the right, looking at Fig. 2, thereby locking out the overrunning clutch and pushing on the handle 72, from a neutral position, will throw the overspeed drive into position. The shift rod 64 for the overspeed drive is provided with a notch 73 to receive a locking pin 74 mounted in a wall 75 of the transmission casing. The opposite end of this pin 74 is engaged by a rod 76 having a reduced portion 77 and biased in a direction to maintain the enlarged portion in engagement with the pin 74 by means of a coiled spring 78. This rod 76 is connected to a lever arm 79 mounted on and rotatable with the shaft 80 of the clutch pedal and it will be noted that when the clutch pedal is depressed to disengage the clutch the arm 79 is moved to the right, looking at Fig. 1, thereby shifting the enlarged portion of the rod 76 from the path of the pin 74 and into a position whereby this pin may move out of the notch 73, thus releasing the shift rod 64.

The overspeed drive shift rod 64 is biased toward its neutral position by means of a rod 81 connected at one end to the cross arm 65 and maintained in its neutral position by means of a coiled spring 82. This coiled spring abuts against a collar 83 on the rod 81 which in turn under normal conditions abuts against a wall 84 of the casing. The spring likewise abuts against a sliding collar 85 on the rod in turn held against movement in one direction by a sleeve 86, the arrangement being such that the spring will always tend to move the rod 81 to the position illustrated in Fig. 10. The purpose of this arrangement will appear more fully hereinafter.

The shift rod 58 is provided on its top with a cammed slot 87 within which rests a ball 88. This ball is adapted to engage, when raised by a shifting of the rod 58 in either direction, the coned end 89 of a shift pin 90, which in turn places under compression a coiled spring 91 interposed between the pin 90 and a locking pin 92 which locking pin is adapted to engage in an annular groove 93 in the shift rod 64 under certain predetermined conditions which will appear in the description of the operation of the parts.

The shift rod 57 is provided with an upwardly projecting extension 94 adapted to extend in a groove 95 in the shift rod 64 and to engage a shoulder 96 when the shift rod 57 is shifted to move the transmission into reverse drive so that when so moved the overrunning clutch will be locked out. This notch 95 however is of sufficient length to prevent interference with the movement of the shift rod 64 in the opposite direction.

In operation we will assume first that it is desired to shift into reverse drive. Under these circumstances the clutch pedal is depressed thereby rocking the arm 79 which in turn will move the enlarged portion of the rod 76 from the path of the pin 74. After the depression of the clutch pedal the shift rod 57 is shifted to the left, looking at Fig. 10, to shift the transmission gears into reverse drive. This shifting of the rod 57 to the left will engage the extension 94 with the shoulder 96, thereby shifting the rod 64 to the left, looking at Fig. 10. This places the coiled spring 82 under compression and at the same time through the linkage connection 66—67 and operating arm 56, will shift the shaft 6 to the right, looking at Fig. 2, until the teeth 15 mesh with the teeth 14, thereby establishing a two-way drive connection between the shaft 4 and the shaft 7. Due to the two-way drive the overrunning clutch is locked out and the propeller shaft may be moved or rotated in a reverse direction. As soon however as the shift rod 57 is moved back to neutral the shift rod 64 will likewise be moved back to neutral under the influence of the coiled spring 82.

It will be noted that the coiled spring 91 is placed under tension only when the shift rod 58 is shifted to the left, looking at Fig. 10. That is when the shift rod 58 is shifted to move the standard transmission into high. The slot 87 is of such length that if the shift rod 58 is moved to the right, looking at Fig. 10, the ball 88 will not be raised into the path of the pin 90. It will also be noted that the shift rod 57 does not affect the tensioning of the coiled spring 91. Therefore when the rod 57 is shifted into low or the rod 58 is shifted into second, if any attempt be made to shift the overspeed transmission into operative position, that is to move the shift rod 64, the coiled spring 82 will be placed under compression and as soon as the handle 72 is released this coiled spring will return the parts to their normal position or into the non-operative position. Therefore it is not possible to shift the overspeed into operation, or at least allow the same to remain in operative position, so long as the transmission is in second or low speed. However when the transmission is shifted into high speed, that is the shift rod 58 is shifted to the left, looking at Fig. 10 the ball 88 will be raised into engagement with the coned end of the pin 90 thereby placing the coiled spring 91 under compression. Then if the shift rod 64 is moved to the right, looking at Fig. 10, to shift the overspeed into operation the poppet member 92 will engage in the groove 93 and retain the rod in its shifted position against the action of the coiled spring 82 until the operator manually shifts the rod out of operating position.

In Figs. 8 and 9 I have illustrated a modified means of locking the sun gear against rotation. In this structure I provide a locking plate 42a corresponding to the plate 42 and having the engaging teeth 41a. This plate is provided with radially-extending fingers 43a. Secured to the housing are a pair of plates 45a between which is placed a spacer ring 97. Each of these plates is provided with notches to form inwardly-extending radial abutments 44a and interposed between these abutments, which are formed by the side walls of the notches, and the radial fingers 43a are coiled springs 46a which in effect take the place of the sound deadening resilient material 46 and, as with the structure illustrated in Fig. 5, torsionally resiliently connect the sun gear to the casing.

I claim as my invention:

1. In a transmission, the combination with a driven shaft, of a driving member for said shaft provided with clutch teeth, said member also having one member of an overrunning clutch and a ring gear, a driving shaft, an intermediate shaft axially shiftable relatively to said driving and driven shafts and drivingly connected to the driving shaft, clutch teeth on said intermediate shaft for engagement with the clutch teeth of said driving member to establish a direct drive between the driving and driven shafts, a second member of an overrunning clutch connected to said intermediate shaft to establish a one-way drive between said driving and driven shafts when said clutch teeth are disengaged from the driving member, a stationarily mounted sun gear, a plurality of pinions interposed between said sun gear and ring gears, a mounting for said pinions, and means for drivingly connecting said mounting with said intermediate shaft to establish a change speed drive between the driving and driven shafts.

2. In a transmission, the combination with a driving shaft and a driven shaft, of a planetary gear train for operating said driven shaft at a greater speed than the driving shaft, a one-way clutch and a two-way clutch and a single shiftable element for effecting selective driving connection between said driving and driven shafts either through said gear train, said one-way clutch, or said two-way clutch to establish respectively a different speed two-way drive, a one-way drive and a direct two-way drive between said driving and driven shafts.

3. In a transmission, the combination with a casing, of a driven shaft extending into said casing, a driving shaft extending into said casing, a ring gear connected to said driven shaft, a sun gear arranged in said casing having radial projections on the hub thereof, a locking plate secured to said casing having notches therein for the reception of said radial projections, sound deadening material interposed between said radial projections and the walls of said notches, a plurality of pinion gears interposed between said sun and ring gears, a pinion carrier for said pinion gears, and means for connecting said pinion carrier to said driving shaft.

4. In a transmission, the combination with a casing, a driven shaft extending into said casing, a driving shaft extending into said casing, a ring gear connected to said driven shaft, a sun gear mounted in said casing, a securing ring mounted on one wall of said casing, a clamping ring for said securing ring, means for securing said clamping ring to said wall, rings of sound deadening material interposed between said securing ring, said clamping ring, and said wall, means for connecting said securing ring to said sun gear, sound deadening material interposed between said means and the securing ring, a plurality of pinion gears interposed between said sun and ring gears, a pinion carrier for said pinion gears, and means for connecting said pinion carrier to said driving shaft.

5. In a transmission, the combination with a driving shaft and a driven shaft, of an intermediate axially shiftable shaft drivingly connected with said driving shaft, a ring gear, one member of a one-way clutch, and one member of a two-way clutch connected to said driven shaft and surrounding the axis of said intermediate shaft, a sun gear surrounding said intermediate shaft, pinion gears interposed between said sun and ring gears, a pinion carrier for said pinion gears surrounding said intermediate shaft, one member of a two-way clutch connected to said pinion carrier, a second member of a one-way clutch mounted on said intermediate shaft, and a second member of a two-way clutch on said intermediate shaft adapted for selective engagement with either of said first-mentioned two-way clutch members.

6. In a transmission, the combination with a driven shaft and a driving shaft, of a planetary gear train, a one-way clutch and a two-way clutch, and an axially shiftable member extending through said gear train for effecting selective driving connection between said driven and said driving shafts through either said gear train to establish a one-way drive therebetween, said one-way clutch to establish a different-speed two-way drive therebetween, or said two-way clutch to establish a direct two-way drive between said shafts.

7. In a transmission, the combination with a casing, of a driven shaft extending into said casing, a driving shaft extending into said casing, a ring gear connected to one of said shafts, a sun gear arranged in said casing, and surrounding the axes of said shafts and having a limited radial shifting movement, a connection between said sun gear and said casing for resiliently holding the sun gear against substantial rotation while permitting a limited radial shifting thereof, means for locking said sun gear against axial displacement in either direction, a plurality of pinion gears interposed between said sun gear and ring gear, said pinion, ring and sun gears having parallel axes, a pinion carrier for said pinion gears, and means for connecting said pinion carrier to the other shaft.

8. In a transmission, the combination with a casing, of a driven shaft extending into said casing, a driving shaft extending into said casing, a ring gear connected to one of said shafts, a sun gear arranged in said casing and having a limited radial movement, a rotatively resilient connection between said sun gear and casing permitting said limited radial movement while resiliently holding the sun gear against substantial rotative movement, means for locking the sun gear against substantial axial displacement in either direction, a plurality of pinion gears interposed between said sun gear and ring gear, said pinion, sun and ring gears having parallel axes, a pinion carrier for said pinion gears, and means for connecting said pinion carrier to the other shaft.

9. In a transmission, the combination with a driven shaft, of a driving member for said shaft provided with clutch teeth, said member also having one member of an overrunning clutch and a ring gear, a driving shaft, an intermediate shaft, axially shiftable relatively to said driven shaft and drivingly connected with the driving shaft, a rotatably stationary sun gear, pinions interposed between said sun and ring gears, a pinion carrier having clutch teeth thereon, an inner member for said overrunning clutch having clutch teeth thereon, and a set of clutch teeth on said axially shiftable shaft adapted to engage the clutch teeth on said driving member for establishing a direct two-way drive between said driving and driven shafts when shifted in one direction and when shifted in the opposite direction adapted to engage the clutch teeth on the inner member of said overrunning clutch to establish a one-way direct drive between said driving or driven shafts and by a continued movement in the same direction adapted to engage the clutch teeth on said pinion carrier, without being disengaged from the clutch teeth of said overrunning clutch member to establish a drive between the driving and driven shafts through said planetary gearing.

10. In a transmission, the combination with a driving shaft and a driven shaft, of a planetary gear train for operating said driven shaft at a greater speed than the driving shaft, a one-way clutch and a two-way clutch, a single shiftable element for effecting selective driving connection between said driving and driven shafts either through said gear train, said one-way clutch or said two-way clutch to establish respectively a different speed, one-way or two-way direct drive between said driving and driven shafts, said element maintaining the members of said one-way clutch in driving relation with the driving shaft while the drive is through said gear train.

11. In a transmission, the combination with a driven shaft and a driving shaft, of a planetary gear train, a one-way clutch and a two-way clutch and an axially shiftable member extending through said gear train for effecting selective driving connection between said driven and driving shafts either through said gear train to establish a different speed two-way drive between said driving and driven shafts, said one-way clutch to establish a one-way direct drive between said driving and driven shafts or said two-way clutch to establish a direct two-way drive between said driving and driven shafts, said axially shiftable element maintaining the driving connection between one of the members of said one-way clutch and the driving shaft when the drive is established through said gear train.

12. In a transmission, the combination with a casing, a driving shaft and a driven shaft extending into said casing, of a planetary gearing in said casing for drivingly connecting said shafts comprising nested ring, pinion and sun gears, the ring gear being connected to the driven shaft and the sun gear being formed on a sleeve surrounding the axes of said shafts, a disk splined on said sleeve having notches in the periphery thereof, coiled springs mounted in said notches and projecting beyond the sides of said disk and a pair of disks secured to said casing and receiving between them the first-mentioned disk, said pair of disks having abutments against which the ends of said coiled springs abut.

13. In a transmission, the combination with a casing, a driving shaft and a driven shaft extending into said casing, of a planetary gearing in said casing for drivingly connecting said shafts comprising nested ring, pinion and sun gears, the ring gear being connected to the driven shaft and the sun gear being formed on a sleeve surrounding the axes of said shafts, a disk splined on said sleeve, having notches formed in the periphery thereof, two-way compression members mounted in said notches and projecting beyond the sides of said disk, and a pair of disks secured to said casing and receiving said first-mentioned disk between them, said disks having abutments against which the ends of said two-way compression members engage.

14. In a transmission, the combination with a casing, a driving and a driven shaft extending into said casing, of a planetary gearing in said casing for drivingly connecting said shafts comprising nested ring, pinion and sun gears, the ring gear being connected to the driven shaft and the sun gear being formed on a sleeve surrounding the axes of said shafts, an abutment member splined on said sleeve having spaced abutments, a second abutment member secured to said casing having spaced abutments, and springs interposed between the spaced abutments of one of said members and engaging the spaced abutments of the other member, said springs being compressible in either direction between said abutment members.

15. In a transmission, the combination with a casing, a driving and a driven shaft extending into said casing, of a planetary gearing in said casing for drivingly connecting said shafts comprising nested ring, sun and pinion gears, the ring gear being connected to the driven shaft and the sun gear being formed on a sleeve surrounding the axes of said shafts, means for rotatably resiliently connecting said sleeve to the casing and means engaging a substantially non-rotatable part and engaging a portion of said sleeve to lock said sleeve against axial movement in either direction.

16. In a transmission, the combination with a casing, a driving and a driven shaft extending into said casing, of a planetary gearing in said casing for drivingly connecting said shafts comprising nested ring, pinion and sun gears, said ring gear being connected to the driven shaft, a pinion carrier for said pinion gears, said sun gear being formed on a sleeve surrounding the axes of said shafts and being movable at right angles to the axes of said shafts, a sound deadening connection between said sleeve and said casing, holding the sleeve against substantial rotative movement while permitting a slight shifting of the sun gear transversely to its axes and means for selectively directly connecting said driving and driven shafts or connecting the driving shaft to the pinion carrier, said connecting means permitting a slight annular floating of the pinion carrier and the pinions carried thereby.

17. The combination with a casing, a driving shaft and a driven shaft extending into said casing, of a planetary gearing in said casing for drivingly connecting said shafts comprising nested ring, pinion and sun gears, said ring gear being connected to the driven shaft and said sun gear being formed on a sleeve surrounding the axes of said shafts, an abutment member splinedly connected to said sleeve, means for axially locking said sleeve and abutment member against relative axial displacement in either direction, abutment means secured to said casing including means for holding said sleeve abutting means against axial displacement in either direction and sound deadening means interposed between the abutments of said abutment members.

18. In a transmission, the combination with a casing, of a driven shaft extending into said casing, a driving shaft extending into said casing, a ring gear connected to said driven shaft, a sun gear arranged within said casing having a limited radial movement relative to the axis of said shafts, means for rotatively resiliently connecting said sun gear to said casing to hold the same against substantial rotation, and permitting a radial displacement of said sun gear relative to said axis, means for locking said sun gear against substantial axial displacement in either direction, a plurality of pinion gears interposed between said ring gear and sun gear, the axes of said pinion, sun and ring gears being parallel, a pinion carrier for said pinion gears, and means for connecting said carrier to said driving shaft.

19. In a transmission, the combination with a casing, of a driven shaft extending into said casing, a driving shaft extending into said casing, a ring gear connected to said driven shaft, a sun gear arranged in said casing having radial projections connected to the hub thereof, a locking plate secured to said casing having radial abutments thereon, bolts extending through said locking plate, sound deadening means interposed between said locking plate and said casing and between said locking plate and said bolt heads, resilient members interposed between said radial projections and said abutments, a plurality of pinion gears interposed between said sun and ring gears, a pinion carrier for said pinion gears and means for connecting said pinion carrier to said driving shaft.

20. In a transmission, the combination with a casing, of a driven shaft extending into said casing, a driving shaft extending into said casing, a ring gear connected to one of said shafts, a plurality of pinions meshing with said ring gear, a pinion carrier for said pinions, axially slidable means for drivingly connecting one of said shafts to the other shaft through said pinions or directly, a sun gear surrounding said axially shiftable means in engagement with said pinions, interdigitated fingers connected respectively to said sun gear and said casing, resilient means interposed between the fingers connected to said casing and the fingers connected to said sun gear, means for rigidly connecting the casing fingers to the casing and sound deadening means between said casing and fingers and between said connecting means and fingers.

21. In a transmission, the combination with a casing, of a driven shaft extending into said casing, a driving shaft extending into said casing, a ring gear connected to one of said shafts, a plurality of pinions meshing with said ring gear, a pinion carrier for said pinions, axially shiftable means for connecting said pinion carrier to the other of said shafts or for directly connecting said shafts together, a sun gear surrounding said axially shiftable means and meshing with said pinions, said sun gear having a splined hub, a holding plate having a splined opening for receiving said hub, a second holding plate, means for rigidly connecting said second plate to said casing, sound-deadening means interposed between said second plate and casing and between said second plate and connecting means, interdigitated members on said plates, and resilient means interposed between said interdigitated members.

22. In a transmission, the combination with a casing, of a driving shaft and a driven shaft extending thereinto in axial alinement, a ring gear connected to one of said shafts, a sun gear, means connecting said sun gear to the casing to hold said sun gear against rotation, including a member rigidly connected to the casing, sound-deadening means interposed between said member, the casing and means connected to the sun gear member, sound deadening means between said sun gear connecting means and the member connected to the casing, a plurality of pinions meshing with said ring gear and said sun gear, a pinion carrier for said pinions, and axially shiftable means for connecting one of said shafts to said pinion carrier or to said other shaft.

23. The combination with a driving shaft and a driven shaft, of a transmission gearing including a gear for driving the driven shaft in a reverse direction, a secondary gear train for connecting said transmission with the driven shaft and driving said driven shaft at a greater speed than the driving shaft, a one-way clutch and a two-way clutch, a single shiftable element for effecting selective driving relation between said driving and driven shafts either through said overspeed gear train or said one-way clutch or said two-way clutch to establish respectively an overspeed drive, a one-way drive or a two-way drive between said driving and driven shafts, means for automatically disconnecting said driving relation between said driving and driven shafts through said overspeed train when said transmission gearing is shifted into neutral, and means shiftable with said reverse gear when the same is shifted into reverse drive for shifting said shiftable member to establish a two-way drive between said shafts through said two-way clutch.

24. The combination with a driving shaft and a driven shaft, of a transmission gearing including a gear for driving the driven shaft in a reverse direction, a secondary gear train for connecting said transmission with the driven shaft and operating said driven shaft at a greater speed than the driving shaft, a one-way clutch and a two-way clutch, a single shiftable element for effecting selective driving connection between said driving and driven shafts either through said overspeed drive, said one-way clutch, or said two-way clutch to establish an overspeed drive between said shafts, a one-way drive or a two-may drive between said shafts, and means shiftable with said reverse gear when the same is shifted to drive the driven shaft in reverse direction for shifting said shiftable element to establish driving relation between the driving and driven shafts through said two-way clutch.

25. The combination with a driving shaft and a driven shaft, of a transmission gearing for driving the driven shaft including a reverse gear drive, a secondary gear train for connecting the transmission with the driven shaft and operating said driven shaft at a greater speed than the driving shaft, a one-way clutch and a two-way clutch, a single shiftable element for effecting driving connection between said driving and driven shafts either through said overspeed drive or said one-way clutch, or said two-way clutch, and means shiftable with the said reverse gear drive when the same is shifted into operative position for shifting said shiftable element to establish a drive through said two-way clutch.

26. The combination with a driving shaft and a driven shaft, of a transmission gearing including a reverse gear, a secondary gear train for connecting the transmission with the driven shaft and operating said driven shaft at a greater speed than said driving shaft, a one-way clutch and a two-way clutch, means for effecting a selective drive between said shafts through said overspeed drive, said one-way clutch, or said two-way clutch, and means shiftable with said reverse gear when the same is shifted into operative position for causing said drive selective means to establish a two-way drive between said shafts through said two-way clutch, said last mentioned means insuring a disconnection of said overspeed drive whenever said reverse drive is effected.

27. The combination with a driving shaft and a driven shaft, of a transmission gearing including a direct drive, a plurality of low-speed drives and a reverse drive, a secondary gear train for connecting said transmission with the driven shaft and operating said driven shaft at a greater speed than said driving shaft, a one-way clutch and a two-way clutch, means for effecting a selective drive between said shafts through said overspeed gear train, said one-way clutch, or said two-way clutch, means operated by a means effecting the shifting of said first-mentioned transmission out of direct drive for insuring a disconnection of said drive through the overspeed train, and means shiftable with said reverse gear drive when the same is shifted into driving relation for causing said drive selecting means to establish a two-way drive between said shafts through said two-way clutch.

28. The combination with a driving shaft and a driven shaft, of a transmission having a plurality of speed drives including a direct drive and shifting means including a shift lever for manipulating said transmission, a secondary driving train between said transmission and the driven shaft for connecting said transmission to the driven shaft and including an overspeed drive and a direct drive, means independent of said shift lever for selectively establishing a drive through said overspeed drive or said second-mentioned direct drive, and means operating said selective means to disconnect said overspeed drive whenever said shift lever is operated to shift the transmission out of said first-mentioned direct drive.

29. The combination with a driving shaft and a driven shaft, of a speed changing transmission including a plurality of speed drives and a direct drive and a shift lever for manipulating said transmission, a secondary driving train between said transmission and the driven shaft for connecting the transmission to the driven shaft including an overspeed drive and a direct drive, means independent of said shift lever for selectively establishing a drive through said overspeed drive or said second-mentioned direct drive, and means operating said selective means to establish said second-mentioned direct drive whenever said transmission is shifted out of said first-mentioned direct drive.

30. In a transmission, the combination with a driven shaft, of a driving member for said shaft having one member of an overrunning clutch and a ring gear and adapted for connection with the driven shaft, a driving shaft, a second member of an overrunning clutch adapted to be constantly drivingly connected with said driving shaft, a relatively stationarily mounted sun gear, a plurality of pinions interposed between said sun gear and said ring gear, a mounting for said pinions, said mounting being adapted for connection with the driving shaft to establish a change speed drive between said driving and driven shafts through said pinions and ring gear, said overrunning clutch when the drive is through said change speed drive permitting a different speed ratio between said shafts without disconnecting the members thereof from their respective shafts and an axially shiftable member for selectively establishing a two-way drive directly between said driving and driven shafts, or a one-way drive through said one-way clutch.

31. In a transmission, the combination with a driven shaft, of a driving member for said shaft provided with clutch teeth, said member also having one member of an overrunning clutch and a ring gear, a driving shaft, a second member of an overrunning clutch adapted to be constantly drivingly connected with said driving shaft, a relatively stationarily mounted sun gear, a plurality of pinions interposed between said sun and ring gears, a mounting for said pinions adapted for connection with the driving shaft to establish a change speed drive between said driving and driven shafts through said pinions and ring gear, said overrunning clutch when the drive is through said change speed drive permitting a different speed ratio between said shafts without disconnecting the members thereof from their respective shafts, clutch teeth on the second member of said overrunning clutch and an axially shiftable member having teeth adapted for engagement with the clutch teeth of said first-mentioned driving member and with the teeth on said second member of the overrunning clutch, said member being shiftable to engage the teeth thereof with both of said first-mentioned teeth for establishing a direct drive between said shafts independently of said overrunning clutch and shiftable to disengage its teeth from one of said sets of teeth for establishing a drive between said shafts through said overrunning clutch.

32. In a tranmission, the combination with a driving shaft and a driven shaft, of a planetary gear train for driving said driven shaft at a greater speed than the driving shaft and having a member adapted for connection with one of said shafts to establish a drive between said shafts through said train, a one-way clutch for drivingly connecting said shafts and permitting a different speed ratio drive between said shafts through said overspeed drive without disconnecting the members of said clutch from their respective shafts and a two-way clutch for drivingly connecting said shafts and a single shiftable element for effecting a selective drive connection between said shafts through said one-way clutch or said two-way clutch to establish either a direct one-way drive between said shafts or a direct two-way drive between said shafts.

33. In a transmission, the combination with a driving shaft and a driven shaft, of a planetary gear train for driving said driven shaft at a greater speed than said driving shaft, a one-way clutch having its members adapted for connection with the respective shafts to establish a one-way drive between said shafts and a two-way clutch having its members adapted for connection with the respective shafts to establish a two-way drive between said shafts and a single shiftable element for effecting the drive of said driven shaft from said driving shaft through said gearing, said one-way clutch, or said two-way clutch, to establish an overspeed drive between said driving and driven shafts, a direct one-way drive between said driving and driven shaft, or a direct two-way drive between said driving and driven shafts.

34. In a device of the character described, the combination with driving and driven shafts, of a planetary gearing for drivingly connecting said shafts comprising a relatively stationarily mounted sun gear, the mounting of said sun gear permitting the limited floating movement of the same about its axis, a ring gear connected to one of said shafts, a plurality of pinions nesting between said sun and ring gears, a pinion carrier for said pinions and a connection between said pinion carrier and the other shaft provided with radial play to permit a limited radial floating movement of said carrier relative to said shaft.

35. In a transmission, in combination, a casing, a driving and a driven shaft extending into said casing, a planetary gearing in said casing for drivingly connecting said shafts comprising a sun gear rotatably resiliently connected to said casing and anchored against substantial rotation by said connection, a ring gear connected to one of said shafts, a plurality of pinions nesting between said sun and ring gears, a pinion carrier and a connection between said pinion carrier and the other shaft provided with radial play to permit a limited radial floating movement of said carrier relative to said shaft.

36. In a transmission, in combination, a casing, driving and driven shafts extending into said casing, a planetary gearing in said casing for drivingly connecting said shafts comprising a sun gear rotatably resiliently connected to said casing to anchor the same against substantial rotation, said connection permitting a floating movement of said sun gear about its axis, a ring gear connected to one of said shafts, a plurality of pinions nesting between said sun and ring gears, a pinion carrier and a connection between said pinion carrier and the other of said shafts provided with radial play to permit a limited radial floating movement of said carrier relative to said shaft.

37. In a transmission, in combination, a casing, driving and driven shafts extending into said casing in axial alignment, a sun gear surrounding the axis of said shafts, means for rotatively resiliently connecting said sun gear to said casing to anchor the same against substantial rotation, said means permitting a limited floating movement of said sun gear about its axis, a ring gear connected to one of said shafts and surrounding the axis of said shafts, pinions nesting between said ring and sun gears, a pinion carrier for said pinions, and a connection between said pinion carrier and the other of said shafts provided with radial play to permit a limited radial floating movement of said carrier relative to said shaft.

38. In a transmission, the combination with a casing, of a driven shaft extending into said casing, a driving shaft extending into said casing, a ring gear connected to one of said shafts, a sun gear member having a limited radial movement at one end, a sun gear on said radially moving end, resilient centering and locking means for said member connected to said casing and engaging the opposite end of said member and holding the member against substantial rotation while permitting said limited radial movement of the free end of the member, means for locking said member against axial displacement in either direction, a plurality of pinion gears interposed between said sun and ring gear, the pinion, sun, and ring gears having parallel axes, a pinion carrier and means for connecting said carrier to the other of said shafts.

39. In a device of the character described, the combination with driving and driven shafts, of a planetary gearing for drivingly connecting said shafts comprising a relatively stationarily mounted sun gear, the mounting of said sun gear permitting a limited floating movement of the same about its axis, a ring gear concentric with said sun gear and connected to one of said shafts, a plurality of pinions nesting between said sun and ring gears, a pinion carrier for said pinions and means for connecting said pinion carrier to the other of said shafts, including a connection provided with radial play to permit a limited substantially radial floating movement of said pinions relative to said ring gear.

40. In a transmission, in combination, a casing, a driving and a driven shaft extending into said casing, a planetary gearing in said casing for drivingly connecting said shafts, comprising a sun gear having a limited substantially radial floating movement relative to said shafts, means for connecting said sun gear to said casing to hold the same against substantial rotation, including a slip connection permitting said relative floating movement, a ring gear concentric with said sun gear and connected to one of said shafts, a plurality of pinions nesting between said sun and ring gears, a pinion carrier and means for connecting said pinion carrier to the other of said shafts, including a connection provided with radial play to permit a limited substantially radial floating movement of said pinions relative to said ring gear.

41. In a transmission, in combination, a casing, a driving and driven shaft extending into said casing, a planetary gearing in said casing for drivingly connecting said shafts, comprising a sleeve surrounding the axes of said shafts, a sun gear mounted at one end of said sleeve, means for connecting the opposite end of said sleeve to said casing to prevent substantial rotation of said sleeve, including a connection provided with radial play to permit limited floating movement, a ring gear concentric with said sun gear and connected to one of said shafts, pinions nesting between said ring and sun gears and having pinion shafts, a pinion carrier including a member connected to one end of said pinion shafts, and means for connecting said member to the other of said shafts, including a connection provided with radial play to permit a limited substantially radial floating movement of said pinions relative to said ring gear.

42. In a transmission, in combination, a casing, driving and driven shafts extending into said casing, a planetary gearing in said casing for drivingly connecting said shafts, comprising a sleeve having a sun gear mounted on one end thereof, surrounding the axes of said shafts and having a limited floating movement relative to the axes of said shafts, radial teeth on the opposite end of said sleeve, a ring member connected to said casing and having internal teeth engaged by the radial teeth of said sleeve to hold said sleeve against substantial rotative movement while permitting said limited floating movement of the sun gear, a ring gear concentric with said sun gear and connected to one of said shafts, pinions nesting between said ring and sun gears having pinion shafts, and means for connecting said pinion shafts to the driving shaft including a member connected to one end of the pinion shafts and having internal teeth, and radial teeth connected to the other of said shafts, engaging said internal teeth and permitting a limited substantially radial floating movement of said pinions relative to the ring gear.

43. In a transmission, the combination with a casing and a driving and driven shaft extending into said casing, of a planetary gearing in said casing for drivingly connecting said shafts comprising nested ring, sun and pinion gears, the ring gear being connected to the driven shaft and the sun gear being formed on a sleeve surrounding the axes of said shafts, resilient means locking said sleeve to the casing against substantial rotation, and means engaging an axially fixed part and engaging a portion of said sleeve to lock said sleeve against axial movement in either direction.

44. In a transmission, the combination with a driving shaft and a driven shaft, of a planetary gear for operating said driven shaft at a greater speed than said driving shaft, a one-way clutch and a single shiftable element for effecting selective driving connection between said driving shafts either through said gear train to establish a different speed two-way drive between said shafts or through said one-way clutch to establish a direct drive between said shafts through said one-way clutch.

45. In a transmission, the combination with a driving shaft and an axially aligned driven shaft, of a head having an internal gear and splined on said driven shaft, a pinion carrier surrounding the axis of said shafts having internal teeth adapted for connection with external teeth drivingly connected with said driving shaft, a sun gear sleeve surrounding the axis of said driving and driven shafts, having a sun gear thereon and external teeth at one end thereof, a holding disc having internal teeth engaging said external teeth on said sun gear, means for holding said disc against substantial rotation and pinion gears nesting said ring gear and meshing with said sun gear mounted on said pinion carrier for establishing a planetary overdrive between said driving and driven shafts.

46. In a transmission, the combination with a driving shaft and a driven shaft, of a planetary gear train for driving said driven shaft at a greater speed than the driving shaft and having a member adapted for connection with one of said shafts to establish a drive between said shafts through said train, a one-way clutch for drivingly connecting said shafts and permitting a different speed ratio drive between said shafts through said over-speed drive without disconnecting the members of said clutch from their respective shafts, and a single shiftable element for effecting a selective drive connection between said shafts through said one-way clutch or through said planetary gear train.

47. In a transmission, the combination with a driven shaft, of a head drivingly connected thereon having an overhanging portion, one member of an overrunning clutch formed on the inner periphery of said overhanging portion, an internal gear of a planetary gear train carried by said head, a driving shaft in axial alignment with said driven shaft, a second member of an overrunning clutch connected to said driving shaft, a sun gear surrounding the axes of said shafts, a disc member connected to said sun gear, means for connecting said disc member to a stationary part to prevent rotation thereof and the sun gear, planet pinions meshing with said sun and ring gears, a pinion carrier for said planet pinions, means for connecting said pinion carrier to said driving shaft to establish a drive between said driving shaft and said driven shaft through said planetary gear train and means for establishing a two-way direct drive between said shafts after said planetary gear drive has been disestablished.

48. In a transmission, the combination with a driven shaft, of a head connected thereto having an overhanging portion, one member of an overrunning clutch formed on the inner periphery of said overhanging portion and an internal gear of a planetary gear train carried by said head, a driving shaft in axial alignment with said driven shaft, a second member of an overrunning clutch connected to said driving shaft, a sun gear, means for connecting said sun gear to a stationary member to prevent rotation of sun gear, said sun gear surrounding the axis of said shafts, planet pinions meshing with said sun and ring gears, a pinion carrier for said planet pinions, a clutch member carried by said pinion carrier, a second clutch member drivingly connected to the driving shaft and shiftable to engage said first-mentioned clutch member to connect the pinion carrier to the driving shaft and thereby establish a drive between said shafts through said gearing, said shiftable clutch member when disengaged from said pinion carrier clutch member permitting a drive between the said shafts through said overrunning clutch.

49. In a power transmission for a motor vehicle, power driving means including a driving shaft, means including a shaft driven from said driving means and adapted to drive the vehicle, said driving and driven shafts being coaxially arranged for relative rotation, an internal gear rotatable with said driven shaft, a relatively fixed sun gear, a planetary gear engaging said internal gear and said sun gear, clutching structures adapted when declutched to be driven with one of said gears and with said driving means respectively, said clutching structures being adapted when clutched to provide an overdrive from said driving means through said planetary gear to said driven means, and an overrunning clutch including driving and driven portions thereof respectively drivingly associated with said driving means and said driven means, said driven means overrunning said driving means when said driven means is driven from said driving means through said clutching structures.

50. In a drive system for an automotive vehicle, the combination of a selectively shiftable transmission having driving and driven shafts, a propeller shaft operatively connected to the road wheels of said vehicle, a planetary overdrive transmission operatively disposed between said driven shafts and said propeller shaft, said overdrive mechanism being operable for driving said propeller shaft at a rate faster than that of either of said other shafts, said selectively shiftable transmission mechanism being operable for driving said vehicle forwardly and rearwardly, and means shiftable with the shifting of said selectively shiftable transmission for driving said vehicle rearwardly for locking out said overdrive transmission.

51. A change-speed gear for automobiles comprising in combination a gear transmission provided with means for varying its speed ratio and having a tail shaft, a shaft to be driven from said tail shaft, a free wheel clutch for operatively connecting said shafts to provide a 1:1 ratio between the same, gear mechanism for bridging the free wheel clutch to provide an overdrive ratio, means for locking the free wheel clutch, and clutch means cooperable with the overdrive gear mechanism to render the same operative.

52. A change-speed gear for automobiles comprising in combination a gear transmission provided with means for varying its speed ratio and having a tail shaft, a shaft to be driven therefrom, a free wheel clutch for operatively connecting said shafts to provide a 1:1 ratio, gear mechanism for connecting said shafts, capable of planetary movement and provided with driving connection to bridge the free wheel clutch for providing an overdrive ratio, and a clutch member for connecting an element of the overdrive gear mechanism with said tail shaft and shiftable to lock the free wheel clutch.

53. In a vehicle drive, power driving means including a driving shaft, means driven by said power driving means and adapted to drive the vehicle, means including an overrunning clutch for driving said driven means from said driving shaft, and for releasing the drive when said driven means overruns said driving means, auxiliary means intermediate said driving means and driven means for driving said driven means independently of said drive through said overrunning clutch and at a speed different from that of said driving means, a second clutch adapted to control the drive between said driving means and said auxiliary driving means, manually controlled means for reversing the direction of drive of said driving shaft, and means operable to drivingly couple said driving shaft to said driven means in response to actuation of said manually controlled means with said overrunning clutch inoperative.

54. In a vehicle drive, power driving means, means driven by said power driving means and adapted to drive the vehicle, means including an overrunning clutch for driving said driven means from said driving means and for releasing the drive when said driven means overruns said driving means, auxiliary means intermediate said driving means and driven means for driving said driven means at a speed different from that of said driving means, a second clutch adapted to control the drive between said driving means and said auxiliary driving means, clutch means driven with said driven means and adapted for clutching engagement with at least a portion of said second clutch, means for moving at least said portion of said second clutch into clutching engagement with said clutch means to render said overrunning clutch inoperative, and means for driving said portion of said second clutch from said driving means.

55. In a vehicle driving mechanism, a multiple speed ratio changing transmission having a power take-off driving shaft, said driving shaft having a driving extension projecting rearwardly beyond one end of said transmission, an auxiliary drive compartment extending rearwardly from said transmission and adapted to receive an auxiliary overdriving mechanism, said driving shaft extension projecting into said compartment at the forward end thereof, a driven shaft aligned with said driving shaft extension and extending rearwardly in said compartment from adjacent said driving shaft extension for driving the vehicle, an overrunning clutch including driving and driven clutch members respectively drivingly connected to said driving shaft extension and to said driven shaft for transmitting a direct one-way drive from said driving shaft extension to said driven shaft, an auxiliary overdrive gearing intermediate said driving shaft extension and said driven shaft, said overdrive gearing spanning said overrunning clutch whereby to cause said driven clutch member to overrun said driving clutch member when the drive passes through said overdrive gearing, said overdrive gearing including gearing including rotating clutching structures adapted to control the drive therethrough, one of said clutching structures being directly driven from said driving shaft extension while the other is driven through said overdrive gearing at a reduced speed from said driven shaft during said direct one-way drive.

56. In a power transmission for a motor vehicle, power driving means including a driving shaft, means including a shaft driven from said driving means and adapted to drive the vehicle, said driving and driven shafts being co-axially arranged for relative rotation, an internal gear rotatable with said driven shaft, a relatively fixed sun gear, a planetary pinion engaging said internal gear and said sun gear, clutching structures adapted when declutched to be driven by said planetary pinion and by said driving means respectively, said clutching structures being adapted when clutched to provide a drive from said driving means to said driven means, an overrunning clutch including driving and driven portions thereof respectively drivingly associated with said driving means and said driven means whereby to transmit a one-way drive therebetween, said driven means overrunning said driving means when said driven means is driven from said driving means through said clutching structures, and a sleeve drivingly connecting said internal gear and said overrunning clutch driven portion, said sleeve surrounding said clutching structures.

57. In a power transmission for a motor vehicle, power driving means including a driving shaft, means including a shaft driven from said driving means and adapted to drive the vehicle, said driving and driven shafts being coaxially arranged for relative rotation, an internal gear rotatable with said driven shaft, a relatively fixed sun gear, a planetary pinion engaging said internal gear and said sun gear, clutching structures adapted when declutched to be driven by said planetary pinion and by said driving means respectively, said clutching structures being adapted when clutched to provide a drive from said driving means to said driven means, an overrunning clutch including driving and driven portions thereof respectively drivingly associated with said driving means and said driven means whereby to transmit a one-way drive therebetween, said driven means overrunning said driving means when said driven means is driven from said driving means through said clutching structures, and manually operable clutching means for establishing and disconnecting a direct two-way drive from said driving means to said overrunning clutch driven portion.

58. In a power transmission for a motor vehicle, power driving means including a driving shaft, means including a shaft driven from said driving means and adapted to drive the vehicle, said driving and driven shafts being coaxially arranged for relative rotation, an internal gear rotatable with said driven shaft, planetary gearing including at least one planetary pinion engaging said internal gear and also including a relatively stationary sun gear, clutching structures adapted when declutched to be driven by said planetary pinion and by said driving means respectively, said clutching structures being adapted when clutched to provide a drive from said driving means to said driven means, and an overrunning clutch including driving and driven portions thereof respectively drivingly associated with said driving means and said driven means whereby to transmit a one-way drive therebetween, said driven means overrunning said driving means when said driven means is driven from said driving means through said clutching structures.

59. In a driving mechanism for a motor vehicle, power driving means, means driven by said power driving means and adapted to transmit the drive therefrom to actuate the vehicle, an overrunning clutch including driving and driven members respectively drivingly connected to said driving means and to said driven means and adapted to transmit a direct one-way drive therebetween, a clutch including clutching members adapted respectively to be driven from said driving means and from said driven means, a plurality of means adapted respectively to drive said clutching members from said driving and driven means including reduction gearing for driving one of said clutching members at a speed different from the other of said clutching members when said driven means is driven from said driving means through said overrunning clutch, a clutch part carried by one of said plurality of driving means and adapted for operation to drivingly connect said driving and driven means to provide a direct two-way drive therebetween, and means for manually operating said clutch part.

60. In a driving mechanism for a motor vehicle, power driving means, means driven by said driving means and adapted to transmit the drive therefrom to actuate the vehicle, an overrunning clutch including driving and driven members respectively drivingly connected to said driving means and to said driven means and adapted to transmit a direct two-way drive therebetween, a clutch including clutching members adapted to be respectively driven from said driving means and from said driven means, a plurality of means adapted respectively to drive said clutching members from said driving and driven means, one of said plurality of driving means including reduction gearing for driving one of said clutching members at a speed different from that of the other clutching members when said driven means is driven from said driving means through said overrunning clutch, a clutch part drivingly connected to one of said plurality of driving means and adapted for operation to drivingly connect said driving and driven means to provide a direct two-way drive therebetween, and means for manually operating said clutch part.

61. A change speed gear for automobiles comprising in combination, a driving shaft, a shaft to be driven from said driving shaft, a free wheel clutch including driving and driven clutch members respectively adapted for driving connection with said driving and driven shaft for operatively connecting said shafts to provide a 1:1 ratio between the same, gear mechanism for bridging the free wheel clutch to provide an overdrive ratio, said overdrive gear mechanism including an internal gear having continuous drive connection with one of said shafts, means for locking the free wheel clutch, and clutch means cooperable with the overdrive gear mechanism to render the same operative.

62. The combination with a driving and a driven shaft, of a transmission gearing for driving the driven shaft including a reverse gear drive, a secondary gear train for connecting the transmission with the driven shaft and operating the driven shaft at a greater speed than the driving shaft, said secondary gearing including an internal gear having continuous drive connection with one of said shafts, a one-way clutch including driving and driven one-way clutch members respectively adapted for continuous driving connection with the driving and driven shafts, sets of clutch teeth respectively adapted for continuous direct driving connection with the driving and driven shafts, shiftable means carrying one of said sets of clutch teeth and adapted to effect driving connection between the driving and driven shafts either through said secondary gear train, or through said one-way clutch, or through said sets of clutch teeth to provide a two-way drive, and means shiftable with the said reverse gear drive when the same is shifted into operative position for shifting the first said shiftable means to engage said sets of clutch teeth to establish said two-way drive.

63. A change speed gear for automobiles comprising in combination a gear transmission provided with means for varying its speed ratio and having a tail shaft, a shaft to be driven from said tail shaft, a free wheel clutch for operatively connecting said shafts to provide a 1:1 ratio between the same, said free wheel clutch including driving and driven clutch members respectively continuously driven with said tail and driven shafts, gear mechanism for bridging the free wheel clutch to provide an overdrive ratio, said overdrive gear mechanism including an internal gear having continuous drive connection with one of said shafts, means for locking the free wheel clutch, and clutch means cooperable with the overdrive gear mechanism to render the same operative.

WILLIAM B. BARNES.

CERTIFICATE OF CORRECTION.

Patent No. 2,214,986.                                      September 17, 1940.

WILLIAM B. BARNES.

It is hereby certified that error appears in the printed specification of the above numbered patent requiring correction as follows: Page 4, second column, line 73, claim 6, for "one-way" read --different speed two-way--; line 74, same claim, for "different-speed two-way" read --one-way--; page 6, second column, line 2, claim 20, for "wth" read --with--; and that the said Letters Patent should be read with this correction therein that the same may conform to the record of the case in the Patent Office.

Signed and sealed this 22nd day of October, A. D. 1940.

(Seal)

Henry Van Arsdale,
Acting Commissioner of Patents.